(12) United States Patent
Gao et al.

(10) Patent No.: US 12,501,255 B2
(45) Date of Patent: Dec. 16, 2025

(54) DEVICE CAPABILITY IDENTIFIER SIGNALING

(71) Applicant: ZTE CORPORATION, Guangdong (CN)

(72) Inventors: Yuan Gao, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 513 days.

(21) Appl. No.: 17/388,885

(22) Filed: Jul. 29, 2021

(65) Prior Publication Data
US 2021/0360391 A1 Nov. 18, 2021

Related U.S. Application Data

(63) Continuation of application No. PCT/CN2019/075185, filed on Feb. 15, 2019.

(51) Int. Cl.
*H04W 8/24* (2009.01)
*H04W 76/10* (2018.01)
*H04W 76/20* (2018.01)

(52) U.S. Cl.
CPC ............ *H04W 8/24* (2013.01); *H04W 76/10* (2018.02); *H04W 76/20* (2018.02)

(58) Field of Classification Search
CPC ... H04W 76/10; H04W 8/22; H04W 28/0215; H04L 67/303; H04L 69/24
See application file for complete search history.

(56) References Cited

U.S. PATENT DOCUMENTS

| | | | |
|---|---|---|---|
| 2011/0216718 A1* | 9/2011 | Faurie | H04W 8/22 |
| | | | 370/329 |
| 2012/0252472 A1 | 10/2012 | Nakahara | |
| 2014/0098756 A1* | 4/2014 | Tabatabaei Yazdi | |
| | | | H04W 74/0833 |
| | | | 370/328 |
| 2015/0195774 A1 | 7/2015 | Lee et al. | |
| 2019/0037392 A1* | 1/2019 | Horn | H04W 8/26 |
| 2019/0239064 A1* | 8/2019 | Stojanovski | H04W 8/26 |
| 2019/0313239 A1* | 10/2019 | Horn | H04L 5/14 |
| 2019/0363843 A1* | 11/2019 | Gordaychik | H04L 1/08 |
| 2020/0068630 A1* | 2/2020 | Zhang | H04W 28/02 |
| 2020/0260264 A1* | 8/2020 | Hapsari | H04W 88/06 |
| 2020/0305143 A1* | 9/2020 | Shikari | H04W 12/037 |

(Continued)

FOREIGN PATENT DOCUMENTS

| CN | 1741467 A | 3/2006 |
|---|---|---|
| CN | 104429124 A | 3/2015 |

(Continued)

OTHER PUBLICATIONS

International Search Report and Written Opinion for PCT Appl. No. PCT/CN2019/075185, mailed Nov. 8, 2019 (6 pages).

(Continued)

*Primary Examiner* — Yee F Lam
(74) *Attorney, Agent, or Firm* — Foley & Lardner LLP

(57) ABSTRACT

Various techniques for device capability identifier signaling are presented. One example method of wireless communication includes receiving, by a wireless device from a network node, a request for a capability identifier of the wireless device that identifies capabilities of the wireless device and transmitting, in response to the request, the capability identifier or detailed capabilities.

20 Claims, 16 Drawing Sheets

(56) References Cited

U.S. PATENT DOCUMENTS

2021/0258768 A1\* 8/2021 Liu .................... H04W 8/24
2021/0345096 A1\* 11/2021 Shi .................... H04W 8/24
2023/0024664 A1\* 1/2023 Van Lieshout ......... H04W 8/08

FOREIGN PATENT DOCUMENTS

CN          104641691 A     5/2015
WO   WO-2018202138 A1 \* 11/2018 ............ H04W 28/02
WO   WO-2019031540 A1 \* 2/2019 ............ H04W 76/11

OTHER PUBLICATIONS

First Chinese Office Action for CN Appln. No. 2019800953145, dated Dec. 14, 2022 (13 pages, including English translation).
Partial European Search Report for EP Appl. No. 19915454.3, dated Apr. 12, 2022 (13 pages).

\* cited by examiner

```
                         RRCSetup message
-- ASN1START
-- TAG-RRCSETUP-START
RRCSetup ::=                        SEQUENCE {
    rrc-TransactionIdentifier       RRC-TransactionIdentifier,
    criticalExtensions              CHOICE {
        rrcSetup                        RRCSetup-IEs,
        criticalExtensionsFuture        SEQUENCE {}
    }
}
RRCSetup-IEs ::=                    SEQUENCE {
    radioBearerConfig               RadioBearerConfig,
    masterCellGroup                 OCTET STRING (CONTAINING
CellGroupConfig), lateNonCriticalExtension        OCTET STRING
OPTIONAL,
    nonCriticalExtension            RRCConnectionSetup-v16X0-IEs
OPTIONAL
}
RRCConnectionSetup-v16X0-IEs ::= SEQUENCE {
    reportUECapID-16                ENUMERATED {supported}    OPTIONAL,
    nonCriticalExtension            SEQUENCE {}               OPTIONAL
}
-- TAG-RRCSETUP-STOP
-- ASN1STOP
```

```
                    UECapabilityEnquiry message
-- ASN1START
-- TAG-UECAPABILITYENQUIRY-START UECapabilityEnquiry ::=            SEQUENCE {
    rrc-TransactionIdentifier          RRC-TransactionIdentifier,
    criticalExtensions                 CHOICE {
        ueCapabilityEnquiry                UECapabilityEnquiry-IEs,
        criticalExtensionsFuture           SEQUENCE {}
    }
}

UECapabilityEnquiry-IEs ::=    SEQUENCE {
    ue-CapabilityRAT-RequestList       UE-CapabilityRAT-RequestList, lateNonCriticalExtension           OCTET STRING                    OPTIONAL,
    nonCriticalExtension               UECapabilityEnquiry-v16X0-IEs   OPTIONAL
}
UECapabilityEnquiry-v16X0-IEs ::= SEQUENCE {
    reportUECapID-r16              ENUMERATED {supported}     OPTIONAL,
    nonCriticalExtension           SEQUENCE {}                OPTIONAL
}

-- TAG-UECAPABILITYENQUIRY-STOP
-- ASN1STOP
```

UE-CapabilityRAT-ContainerList information element

```
-- ASN1START
-- TAG-UE-CAPABILITY-RAT-CONTAINER-LIST-START

UE-CapabilityRAT-ContainerList ::=SEQUENCE (SIZE (0..maxRAT-
CapabilityContainers)) OF UE-CapabilityRAT-Container UE-CapabilityRAT-Container ::= SEQUENCE {
    rat-Type                      RAT-Type,
    ue-CapabilityRAT-Container    OCTET STRING
}

-- TAG-UE-CAPABILITY-RAT-CONTAINER-LIST-STOP
-- ASN1STOP
```

FIG. 4

```
UECapabilityEnquiry message
-- ASN1START
-- TAG-UECAPABILITYENQUIRY-START

UECapabilityEnquiry ::=           SEQUENCE {
    rrc-TransactionIdentifier         RRC-TransactionIdentifier,
    criticalExtensions                CHOICE {
        ueCapabilityEnquiry               UECapabilityEnquiry-IEs,
        criticalExtensionsFuture          SEQUENCE {}
    }
}

UECapabilityEnquiry-IEs ::=      SEQUENCE {
    ue-CapabilityRAT-RequestList      UE-CapabilityRAT-RequestList, lateNonCriticalExtension          OCTET STRING
OPTIONAL,
    nonCriticalExtension              SEQUENCE{}                      600
OPTIONAL
}

-- TAG-UECAPABILITYENQUIRY-STOP
-- ASN1STOP
```

FIG. 6

```
UE-CapabilityRAT-RequestList information element
-- ASN1START
-- TAG-UE-CAPABILITYRAT-REQUESTLIST-START UE-CapabilityRAT-RequestList ::=        SEQUENCE (SIZE (1..maxRAT-
CapabilityContainers)) OF UE-CapabilityRAT-Request UE-CapabilityRAT-Request ::=            SEQUENCE {
        rat-Type                            RAT-Type,
        capabilityRequestFilter             OCTET STRING
OPTIONAL,    -- Need N
        ...
}
700

-- TAG-UE-CAPABILITYRAT-REQUESTLIST-STOP
-- ASN1STOP
```

FIG. 7

```
UE-CapabilityRequestFilterNR information element

-- ASN1START
-- TAG-UE-CAPABILITYREQUESTFILTERNR-START

UE-CapabilityRequestFilterNR ::=         SEQUENCE {
    frequencyBandList                         FreqBandList
OPTIONAL,  -- Need N
    nonCriticalExtension                      UE-CapabilityRequestFilterNR-
v1540    OPTIONAL
}

UE-CapabilityRequestFilterNR-v1540 ::=    SEQUENCE {
    srs-SwitchingTimeRequest                  ENUMERATED {true}
OPTIONAL,  -- Need N
    nonCriticalExtension                      UE-CapabilityRequestFilterNR-
v16X0    OPTIONAL
}
UE-CapabilityRequestFilterNR-v16X0 ::= SEQUENCE {
    reportUECapID-r16                         ENUMERATED {supported}      OPTIONAL,
    nonCriticalExtension                      SEQUENCE {}                 OPTIONAL
}
-- TAG-UE-CAPABILITYREQUESTFILTERNR-STOP
-- ASN1STOP
```

```
-- ASN1START
-- TAG-RRCSETUPREQUEST-START

RRCSetupRequest ::=            SEQUENCE {
    rrcSetupRequest                RRCSetupRequest-IEs
}

RRCSetupRequest-IEs ::=        SEQUENCE {
    ue-Identity                    InitialUE-Identity,
    establishmentCause             EstablishmentCause,
    reportUECapID                  ENUMERATED {supported}         OPTIONAL    ⟵ 900
}

InitialUE-Identity ::=         CHOICE {
    ng-5G-S-TMSI-Part1             BIT STRING (SIZE (39)),
    randomValue                    BIT STRING (SIZE (39))
}

EstablishmentCause ::=         ENUMERATED {
                                   emergency, highPriorityAccess, mt-Access, mo-
                                   signalling,
                                   mo-Data, mo-VoiceCall, mo-VideoCall, mo-SMS, mps-
                                   PriorityAccess, mcs-PriorityAccess,
                                   spare6, spare5, spare4, spare3, spare2, spare1}

-- TAG-RRCSETUPREQUEST-STOP
-- ASN1STOP
```

FIG. 9

```
-- ASN1START
-- TAG-RRCSETUPCOMPLETE-START

RRCSetupComplete ::=               SEQUENCE {
    rrc-TransactionIdentifier          RRC-TransactionIdentifier,
    criticalExtensions                 CHOICE {
        rrcSetupComplete                   RRCSetupComplete-IEs,
        criticalExtensionsFuture           SEQUENCE {}
    }
}

RRCSetupComplete-IEs ::=           SEQUENCE {
    selectedPLMN-Identity              INTEGER (1..maxPLMN),
    registeredAMF                      RegisteredAMF                                          OPTIONAL,
    guami-Type                         ENUMERATED (native, mapped)                            OPTIONAL,
    s-nssai-List                       SEQUENCE (SIZE (1..maxNrofS-NSSAI)) OF S-NSSAI         OPTIONAL,
    dedicatedNAS-Message               DedicatedNAS-Message,
    ng-5G-S-TMSI-Value                 CHOICE {
        ng-5G-S-TMSI                       NG-5G-S-TMSI,
        ng-5G-S-TMSI-Part2                 BIT STRING (SIZE (9))
    }                                                                                         OPTIONAL,
    lateNonCriticalExtension           OCTET STRING                                           OPTIONAL,
    nonCriticalExtension               RRCSetupComplete-v16X0-IEs
}

RegisteredAMF ::=                  SEQUENCE {
    plmn-Identity                      PLMN-Identity                                          OPTIONAL,
    amf-Identifier                     AMF-Identifier
}

RRCSetupComplete-v16X0-IEs ::= SEQUENCE {                                    ↙ 1000
    reportUECapID-16                   ENUMERATED (supported)                 OPTIONAL,
    nonCriticalExtension               SEQUENCE {}                            OPTIONAL
}

-- TAG-RRCSETUPCOMPLETE-STOP
-- ASN1STOP
```

FIG. 10

```
-- ASN1START
-- TAG-RRCSETUPCOMPLETE-START

RRCSetupComplete ::=                SEQUENCE {
    rrc-TransactionIdentifier       RRC-TransactionIdentifier,
    criticalExtensions              CHOICE {
        rrcSetupComplete                RRCSetupComplete-IEs,
        criticalExtensionsFuture        SEQUENCE {}
    }
}

RRCSetupComplete-IEs ::=            SEQUENCE {
    selectedPLMN-Identity               INTEGER (1..maxPLMN),
    registeredAMF                       RegisteredAMF                                                   OPTIONAL,
    guami-Type                          ENUMERATED {native, mapped}                                     OPTIONAL,
    s-nssai-list                        SEQUENCE (SIZE (1..maxNrofS-NSSAI)) OF S-NSSAI                  OPTIONAL,
    dedicatedNAS-Message                DedicatedNAS-Message,
    ng-5G-S-TMSI-Value                  CHOICE {
        ng-5G-S-TMSI                        NG-5G-S-TMSI,
        ng-5G-S-TMSI-Part2                  BIT STRING (SIZE (9))
    }                                                                                                   OPTIONAL,
    lateNonCriticalExtension            OCTET STRING                                                    OPTIONAL,
    nonCriticalExtension                RRCSetupComplete-v1690-IEs                                      OPTIONAL
}

RegisteredAMF ::=                   SEQUENCE {
    plmn-Identity                       PLMN-Identity                                                   OPTIONAL,
    amf-Identifier                      AMF-Identifier
}

RRCSetupComplete-v1690-IEs ::=  SEQUENCE {                                           ← 1100
    ueCapID-16                          INTEGER(0..65535)                                               OPTIONAL
    nonCriticalExtension                SEQUENCE {}                                                     OPTIONAL
}

-- TAG-RRCSETUPCOMPLETE-STOP
-- ASN1STOP
```

FIG. 11

DEVICE CAPABILITY IDENTIFIER SIGNALING

CROSS-REFERENCE TO RELATED APPLICATION

This application claims the benefit of priority under 35 U.S.C. § 120 as a continuation of PCT Patent Application No. PCT/CN2019/075185, filed on Feb. 15, 2019, the disclosure of which is incorporated herein by reference in its entirety.

TECHNICAL FIELD

The present document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved bandwidth performance are being discussed.

SUMMARY

The present document describes techniques that can be used in various embodiments for signaling of a device capability identifier.

In one example aspect, a method of wireless communication is disclosed. The method includes receiving, by a wireless device from a network node, a request for a capability identifier of the wireless device that identifies capabilities of the wireless device and transmitting, in response to the request, the capability identifier or detailed capabilities.

In another example aspect, another method of wireless communication is disclosed. The method includes transmitting, to a wireless device from a network node, a request for a capability identifier of the wireless device that identifies capabilities of the wireless device, and receiving, in response to the request, the capability identifier or detailed capabilities.

In yet another aspect, a wireless communication apparatus is disclosed. One or more of the above-described methods may be implemented by the wireless communications apparatus that includes a processor.

In yet another aspect, a computer-readable medium is disclosed. The computer-readable medium stored processor-executable code for implementing a method described in the present document.

These, and other, features are described in the present document.

BRIEF DESCRIPTION OF THE DRAWINGS

FIG. 1 shows an example of a radio resource control (RRC) message.

FIG. 2 shows an example of a capability enquiry message.

FIG. 4 shows an example of capability container list information element (IE).

FIG. 6 shows an example of a capability enquiry message.

FIG. 7 shows an example of a capability request list information element.

FIG. 8 shows an example of a capability request filter information element.

FIG. 9 shows an example of an RRC setup request message.

FIG. 10 shows an example of an RRC setup complete message.

FIG. 11 shows an example of an RRC setup complete message.

DETAILED DESCRIPTION

Figure 3:
FIG. 3 shows another example of a capability enquiry message.

Section headings are used in the present document only for ease of understanding and do not limit scope of the embodiments described in each section only to that section. Furthermore, while 5G terminology is used for easy understanding, the scope of the disclosed technology is not limited to 5G networks only.

If both the network and user equipment (UE) support UE capability identifier (ID) based signaling, there is no need to report the detailed capabilities, only UE capability ID will be transferred, thereby saving unnecessary use of wireless bandwidth. Otherwise, UE has to report detailed UE capabilities. To differentiate the two situations, a method to indicate UE capability ID signaling is disclosed in this paper. This method may be implemented on the network side and/or the wireless device side, as described in the present document.

Initial Discussion

With the increase of the size of UE radio capabilities driven by additional bands supported the size of the UE Radio Capabilities will significantly grow from NR Rel-15 onwards, an efficient approach to signal UE Radio Capability information is needed.

A UE capability ID based signaling has been discussed to reduce the signaling overhead in reporting UE radio capabilities. A set of UE radio capabilities is mapped to an UE capability ID. With the mapping dictionary between UE capabilities and the ID stored both on UE side and network side, UE can only report the UE capability ID to network and network can then interpret the detailed radio capabilities based on the mapping dictionary.

As an enhancement to the existing UE radio capability reporting mechanism (in which the detailed capabilities are reported to network), UE capability ID based signaling can be applied together with the existing capability report mechanism.

Legacy UEs who only support detailed capabilities reporting and new UEs who support both UE capability ID based reporting and the traditional detailed capabilities reporting will be in service at the same time. Legacy network who only supports detailed capabilities reporting and the upgraded network who supports both will also be in service at the same time.

Example Technical Solutions

General Description about the Procedure

This patent document introduces, among other techniques, a method to indicate UE capability ID signaling, that may be implemented in some embodiments using the following basic steps can be considered as baseline:

Step 1: UE receive an indication from network indicates that UE capability ID is expected.

Step 2: UE transmits the UE capability ID if it is capable of UE capability ID signaling Various embodiments described herein provide examples of how the indication may be transmitted.

In some embodiments, the indication can be transmitted via system information.

In some embodiments, the indication can be transmitted via dedicated RRC signaling.

In some embodiments, the indication is included in RRC-Setup message. An example is shown in Table 1, with new syntax element identifies as 100 in FIG. 1. This syntax element may include, for example, a sequence of values including optional fields including a UE capability identifier and additional optional non-critical extension fields.

TABLE 1

| RRCSetup message |
|---|
| -- ASN1START |
| -- TAG-RRCSETUP-START |
| RRCSetup ::=                SEQUENCE { |
|     rrc-TransactionIdentifier           RRC-TransactionIdentifier, |
|     criticalExtensions                  CHOICE { |
|         rrcSetup                        RRCSetup-IEs, |
|         criticalExtensionsFuture            SEQUENCE { } |
|     } |
| } |
| RRCSetup-IEs ::=            SEQUENCE { |
|     radioBearerConfig              RadioBearerConfig, |
|     masterCellGroup                OCTET STRING (CONTAINING CellGroupConfig), |
|     lateNonCriticalExtension       OCTET STRING                                      OPTIONAL, |
|     nonCriticalExtension           RRCConnectionSetup-v16X0-IEs                      OPTIONAL |
| } |
| RRCConnectionSetup-v16X0-IEs ::= SEQUENCE { |
|     reportUECapID-16                       ENUMERATED {supported}    OPTIONAL, |
|     nonCriticalExtension                   SEQUENCE { }              OPTIONAL |
| } |
| -- TAG-RRCSETUP-STOP |
| -- ASN1STOP |

In some embodiments, the indication is included in UECapabilityEnquiry message.

In some embodiments, the indication is added directly in a UECapabilityEnquiry message as an information element. An example is shown in Table 2, with relevant fields highlighted as 200 in FIG. 2. The fields include, for example, a UE capability report identifier field and additional non-critical information. The information element may be identified by a new tag, e.g., "UECapabilityEqnuiry-v16X0-IEs," which is a new type of IE.

TABLE 2

| UECapabilityEnquiry message |
|---|
| -- ASN1START |
| -- TAG-UECAPABILITYENQUIRY-START |
| UECapabilityEnquiry ::=         SEQUENCE { |
|     rrc-TransactionIdentifier           RRC-TransactionIdentifier, |
|     criticalExtensions                  CHOICE { |
|         ueCapabilityEnquiry             UECapabilityEnquiry-IEs, |
|         criticalExtensionsFuture            SEQUENCE { } |
|     } |
| } |
| UECapabilityEnquiry-IEs ::=     SEQUENCE { |
|     ue-CapabilityRAT-RequestList        UE-CapabilityRAT-RequestList, |
|     lateNonCriticalExtension            OCTET STRING                                  OPTIONAL, |
|     nonCriticalExtension                UECapabilityEnquiry-v16X0-IEs |

TABLE 2-continued

UECapabilityEnquiry message

OPTIONAL
}
UECapabilityEnquiry-v16X0-IEs ::= SEQUENCE {
    reportUECapID-r16                   ENUMERATED {supported}   OPTIONAL,
    nonCriticalExtension        SEQUENCE { }                 OPTIONAL
}
-- TAG-UECAPABILITYENQUIRY-STOP
-- ASN1STOP In some embodiments, the indication is added as a separate RAT type in UE-CapabilityRAT-Request. An example is shown in Table 3, with relevant fields highlighted as 300 in FIG. 3. For example, as shown in FIG. 3, a new field called UE-CapabilityRAT-RequestList is introduced in the message to enquire UE Capabilities.

TABLE 3

UECapabilityEnquiry message

-- ASN1START
-- TAG-UECAPABILITYENQUIRY-START
UECapabilityEnquiry ::=       SEQUENCE {
    rrc-TransactionIdentifier      RRC-TransactionIdentifier,
    criticalExtensions            CHOICE {
        ueCapabilityEnquiry          UECapabilityEnquiry-IEs,
        criticalExtensionsFuture     SEQUENCE { }
    }
}
UECapabilityEnquiry-IEs ::=    SEQUENCE {
    ue-CapabilityRAT-RequestList   UE-CapabilityRAT-RequestList,
    lateNonCriticalExtension       OCTET STRING
OPTIONAL,
    nonCriticalExtension           SEQUENCE{ }
OPTIONAL
}
-- TAG-UECAPABILITYENQUIRY-STOP
-- ASN1STOP FIG. 4 and Table 4 show examples of UE-CapabilityRAT-ContainerList information element. A new Container that includes RAT-Type of the UE is included.

TABLE 4

UE-CapabilityRAT-ContainerList information element

Figures 5A, 5B:
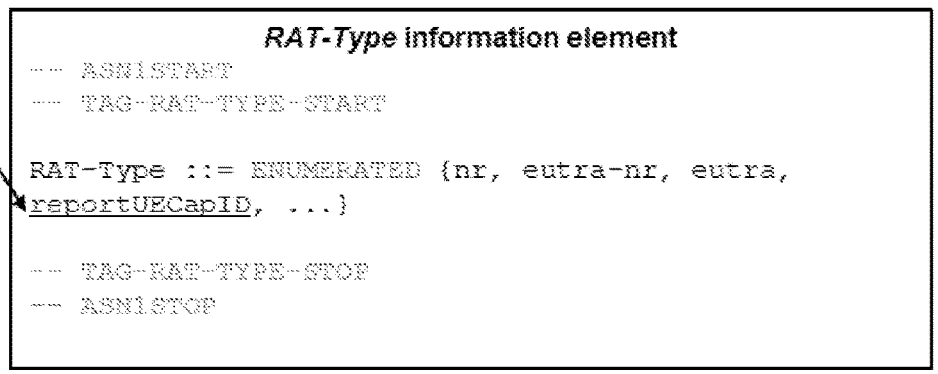
FIG. 5A shows an example of a radio access technology (RAT) type information element.
FIG. 5B shows an example description of a capability request field.

-- ASN1START
-- TAG-UE-CAPABILITY-RAT-CONTAINER-LIST-START
UE-CapabilityRAT-ContainerList ::=SEQUENCE (SIZE
(0..maxRAT-CapabilityContainers)) OF
UE-CapabilityRAT-Container
UE-CapabilityRAT-Container ::= SEQUENCE {
    rat-Type                          RAT-Type,
    ue-CapabilityRAT-Container     OCTET STRING
}
-- TAG-UE-CAPABILITY-RAT-CONTAINER-LIST-STOP
-- ASN1STOP Table 5A and FIG. 5A show an example of RAT-Type information element in which a new field indicating UE capability for reporting (called reportUECapID) is included In particular 400 and 500 show fields that may be used for transmission of the indication. Table 5B and FIG. 5B show a description of the UE-CapabilityRAT-Request field. In particular, description 550 shows the specific use of the description to indicate that the network is requesting a UE capability identifier. For example, rat-Type includes a RAT type for which the network requests UE capabilities. If the RAT type is set to a specific value "reportUECapID" this means that the network requests a UE capability identifier.

TABLE 5A

RAT-Type information element

-- ASN1START
-- TAG-RAT-TYPE-START
RAT-Type ::= ENUMERATED {nr, eutra-nr, eutra, reportUECapID, ...}
-- TAG-RAT-TYPE-STOP
-- ASN1STOP

TABLE 5B

UE-CapabilityRAT-Request field descriptions capabilityRequestFilter
Information by which the network requests the UE to filter the UE capabilities. For ratType set to nr: the encoding of the capabilityRequestFilter is defined in UE-CapabilityRequestFilterNR.
rat-Type
The RAT type for which the NW requests UE capabilities. If the RAT type is set to "reportUECapID", it means the network requests a UE capability identifier.

In some embodiments, the indication is added as an information element in CapabilityRequestFilterNR. Table 6, and FIG. 6 show an example of capability enquiry message. In particular, field 600 shows fields of the IE that may be useful for the transmission of indication. For example, a new field called UE-CapabilityRAT-RequestList is added to the message to indicate that request of capabilities of a UE.

TABLE 6

UECapabilityEnquiry message

-- ASN1START
-- TAG-UECAPABILITYENQUIRY-START
UECapabilityEnquiry ::=       SEQUENCE {
    rrc-TransactionIdentifier      RRC-TransactionIdentifier,
    criticalExtensions            CHOICE {
        ueCapabilityEnquiry          UECapabilityEnquiry-IEs,
        criticalExtensionsFuture     SEQUENCE { }
    }
}
UECapabilityEnquiry-IEs ::=    SEQUENCE {
    ue-CapabilityRAT-RequestList   UE-CapabilityRAT-RequestList,
    lateNonCriticalExtension       OCTET STRING
OPTIONAL,
    nonCriticalExtension           SEQUENCE{ }
OPTIONAL
}
-- TAG-UECAPABILITYENQUIRY-STOP
-- ASN1STOP FIG. 7 (element 700) and Table 7 show examples of syntax elements used for the indication. For example, a new field called UE-CapabilityRAT-Request that includes a capabilityRequestFilter octet string is included in the message.

TABLE 7

UE-CapabilityRAT-RequestList information element

```
-- ASN1START
-- TAG-UE-CAPABILITYRAT-REQUESTLIST-START
UE-CapabilityRAT-RequestList ::=     SEQUENCE (SIZE (1..maxRAT-
Capabilitycontainers)) OF UE-CapabilityRAT-Request
UE-CapabilityRAT-Request ::=         SEQUENCE {
    rat-Type                         RAT-Type,
    capabilityRequestFilter          OCTET STRING      OPTIONAL,    --
Need N
    ...
}
-- TAG-UE-CAPABILITYRAT-REQUESTLIST-STOP
-- ASN1STOP
```

Table 8 provides additional description for the fields used in the message depicted in Table 8 and FIG. 7. In particular, the capabilityRequestFilter octet string provides information by which the network requests the UE to filter UE capabilities when reporting. In case that the ratType is set to "nr", then encoding of this field is defined in the CapabilitiesRequestFilterNR field, as depicted in FIG. 8, element 800.

TABLE 8

UE-CapabilityRAT-Request field descriptions capabilityRequestFilter
Information by which the network requests the UE to filter the
UE capabilities. For ratType set to nr: the encoding of the
capabilityRequestFilter is defined in UE-CapabilityRequestFilterNR.
rat-Type
The RAT type for which the network requests UE capabilities.

Table 9 and FIG. 8 element 800 show examples of the UE-CapabilityRequestFilterNR information elements that may be used for capability indication.

TABLE 9

UE-CapabilityRequestFilterNR information element

```
-- ASN1START
-- TAG-UE-CAPABILITYREQUESTFILTERNR-START
UE-CapabilityRequestFilterNR ::=     SEQUENCE {
    frequencyBandList                FreqBandList           OPTIONAL,
-- Need N
    nonCriticalExtension             UE-CapabilityRequestFilterNR-v1540
OPTIONAL
}
UE-CapabilityRequestFilterNR-v1540 ::=    SEQUENCE {
    srs-SwitchingTimeRequest              ENUMERATED {true}
OPTIONAL,   -- Need N
    nonCriticalExtension                  UE-CapabilityRequestFilterNR-v16X0
OPTIONAL
}
UE-CapabilityRequestFilterNR-v16X0 ::= SEQUENCE {
    reportUECapID-r16         ENUMERATED {supported}   OPTIONAL,
    nonCriticalExtension      SEQUENCE { }             OPTIONAL
}
-- TAG-UE-CAPABILITYREQUESTFILTERNR-STOP
-- ASN1STOP
```

Some embodiments described herein may provide a solution to circumstances under which a network will send such indication to UE?

In some embodiments, the network supports UE capability ID reporting.

in some embodiments, the network supports UE capability ID reporting and UE transmits an indication indicates that UE supports UE capability ID reporting.

In some embodiments, the UE transmits an indication indicates that UE supports UE capability ID reporting via dedicated RRC signaling.

In some embodiments, the UE transmits an indication indicates that UE supports UE capability ID reporting via RRCSetupRequest message. Table 10 and FIG. 9 show an example of this message. The fields 900 show specific new entries that can be added to the message to communicate the indication. For example, as shown in FIG. 9, the new field includes indication of a reportUECapID representing UE capability for reporting. This field may be optional (depending on whether or not UE is able to support the capability).

TABLE 10

| RRCSetupRequest message |
|---|
| -- ASN1START<br>-- TAG-RRCSETUPREQUEST-START<br>RRCSetupRequest ::=         SEQUENCE {<br>    rrcSetupRequest            RRCSetupRequest-IEs<br>}<br>RRCSetupRequest-IEs ::=     SEQUENCE {<br>    ue-Identity                InitialUE-Identity,<br>    establishmentCause         EstablishmentCause,<br>    reportUECapID              ENUMERATED {supported}   OPTIONAL<br>}<br>InitialUE-Identity ::=      CHOICE {<br>    ng-5G-S-TMSI-Part1         BIT STRING (SIZE (39)),<br>    randomValue                BIT STRING (SIZE (39))<br>}<br>EstablishmentCause ::=      ENUMERATED {<br>                               emergency, highPriorityAccess, mt-Access, mo-Signalling,<br>                               mo-Data, mo-VoiceCall, mo-VideoCall, mo-SMS, mps-PriorityAccess, mcs-PriorityAccess,<br>                               spare6, spare5, spare4, spare3, spare2, spare1}<br>-- TAG-RRCSETUPREQUEST-STOP<br>-- ASN1STOP |

In some embodiments, a UE transmits an indication indicates that UE supports UE capability ID reporting via RRCSetupComplete message. Table 11 and FIG. 10 show an example of this message. In particular, field 1000 shows specific syntax elements that can be added to the message to indicate the support. As shown in FIG. 10, the field includes an additional IE called RRCSetupComplete-v16X0-IEs in which an indication for UE capability is provided. Other information may be optionally provided in the non-critical extension fields.

TABLE 11

| RRCSetupComplete message |
|---|
| -- ASN1START<br>-- TAG-RRCSETUPCOMPLETE-START<br>RRCSetupComplete ::=                    SEQUENCE {<br>    rrc-TransactionIdentifier               RRC-TransactionIdentifier,<br>    criticalExtensions                      CHOICE {<br>        rrcSetupComplete                        RRCSetupComplete-IEs,<br>        criticalExtensionsFuture                SEQUENCE { }<br>    }<br>}<br>RRCSetupComplete-IEs ::=                SEQUENCE {<br>    selectedPLMN-Identity                   INTEGER (1..maxPLMN),<br>    registeredAMF                           RegisteredAMF                      OPTIONAL,<br>    guami-Type                              ENUMERATED {native, mapped}        OPTIONAL,<br>    s-nssai-List                            SEQUENCE (SIZE (1..maxNrofS-NSSAI)) OF S-NSSAI    OPTIONAL,<br>    dedicatedNAS-Message                    DedicatedNAS-Message,<br>    ng-5G-S-TMSI-Value                      CHOICE {<br>        ng-5G-S-TMSI                            NG-5G-S-TMSI,<br>        ng-5G-S-TMSI-Part2                      BIT STRING (SIZE (9))<br>    }                                                                          OPTIONAL,<br>    lateNonCriticalExtension                OCTET STRING                       OPTIONAL,<br>    nonCriticalExtension                    RRCSetupComplete-v16X0-IEs         OPTIONAL<br>}<br>RegisteredAMF ::=                       SEQUENCE {<br>    plmn-Identity                           PLMN-Identity                      OPTIONAL,<br>    amf-Identifier                          AMF-Identifier<br>}<br>RRCSetupComplete-v16X0-IEs      ::= SEQUENCE {<br>    reportUECapID-16                        ENUMERATED {supported}   OPTIONAL,<br>    nonCriticalExtension                    SEQUENCE { }             OPTIONAL<br>}<br>-- TAG-RRCSETUPCOMPLETE-STOP<br>-- ASN1STOP |

Some embodiments described herein also disclose a wireless device's (UEs) behavior once the indication is received.

In some embodiments, the UE transmits the UE capability ID if it is capable of UE capability ID signaling via Non-Access-Stratum(NAS) signaling.

In some embodiments, the UE transmits the UE capability ID if it is capable of UE capability ID signaling via RRC dedicated signaling.

In some embodiments, the UE transmits the UE capability ID if it is capable of UE capability ID signaling via RRC-SetupComplete message. Table 12 and FIG. 11 show an example of this message. In particular, field 1100 shows an example of specific syntax elements that can be added to the message to indicate the capability. As shown in FIG. 11, an indication that a new IE called RRCSetupComplete-v16X0-IEs is included may be added to the RRC Setup Complete message. This IE may include a UE capability identifier and additional information in the form of non-critical extensions.

TABLE 12

| RRCSetupComplete message |
|---|
| -- ASN1START<br>-- TAG-RRCSETUPCOMPLETE-START<br>RRCSetupComplete ::=                SEQUENCE {<br>    rrc-TransactionIdentifier              RRC-TransactionIdentifier,<br>    criticalExtensions                      CHOICE {<br>        rrcSetupComplete                    RRCSetupComplete-IEs,<br>        criticalExtensionsFuture            SEQUENCE { }<br>    }<br>}<br>RRCSetupComplete-IEs ::=            SEQUENCE {<br>    selectedPLMN-Identity                   INTEGER (1..maxPLMN),<br>    registeredAMF                           RegisteredAMF<br>OPTIONAL,<br>    guami-Type                              ENUMERATED {native, mapped}<br>OPTIONAL,<br>    s-nssai-List                            SEQUENCE (SIZE (1..maxNrofS-NSSAI)) OF S-NSSAI<br>OPTIONAL,<br>    dedicatedNAS-Message                    DedicatedNAS-Message,<br>    ng-5G-S-TMSI-Value                      CHOICE {<br>        ng-5G-S-TMSI                        NG-5G-S-TMSI,<br>        ng-5G-S-TMSI-Part2                  BIT STRING (SIZE (9))<br>    }                                                                                           OPTIONAL,<br>    lateNonCriticalExtension                OCTET STRING<br>OPTIONAL,<br>    nonCriticalExtension         RRCSetupComplete-v16X0-IEs<br>OPTIONAL<br>}<br>RegisteredAMF ::=                   SEQUENCE {<br>    plmn-Identity                           PLMN-Identity<br>OPTIONAL,<br>    amf-Identifier                          AMF-Identifier<br>}<br>RRCSetupComplete-v16X0-IEs   ::= SEQUENCE {<br>    ueCapID-16                              INTEGER(0..65535)   OPTIONAL,<br>    nonCriticalExtension                    SEQUENCE { }                          OPTIONAL<br>}<br>-- TAG-RRCSETUPCOMPLETE-STOP<br>-- ASN1STOP |

Figure 12:
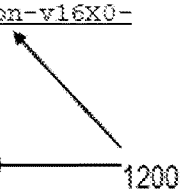
FIG. 12 shows an example of a capability information message.

In some embodiments, a UE transmits the UE capability ID if it is capable of UE capability ID signaling via UECapabilityInformation message. Table 13 and FIG. 12 show an example of a UECapabilityInformation information element used for transmitting capability ID. In particular, field 1200 shows syntax elements that can be used for the signaling. As depicted, the field 1200 includes an indication of inclusion of a UECapabilityInformation-v16X0 IE, which may include a UE capability identifier and additional information as non-critical extensions. UE capability identifier may be an integer having a value between 0 and 65535.

TABLE 13

| UECapabilityInformation message |
|---|
| -- ASN1START<br>-- TAG-UECAPABILITYINFORMATION-START<br>UECapabilityInformation ::=        SEQUENCE {<br>    rrc-TransactionIdentifier               RRC-TransactionIdentifier,<br>    criticalExtensions                      CHOICE {<br>        ueCapabilityInformation             UECapabilityInformation-IEs, |

TABLE 13-continued

```
UECapabilityInformation message criticalExtensionsFuture          SEQUENCE { }
    }
}
UECapabilityInformation-IEs ::=   SEQUENCE {
    ue-CapabilityRAT-ContainerList        UE-CapabilityRAT-ContainerList
OPTIONAL,
    lateNonCriticalExtension              OCTET STRING
OPTIONAL,
    nonCriticalExtension                  UECapabilityInformation-v16X0-IEs
OPTIONAL
}
UECapabilityInformation-v16X0-IEs     ::= SEQUENCE {
    ueCapID-16                            INTEGER(0..65535)    OPTIONAL,
    nonCriticalExtension                  SEQUENCE { }         OPTIONAL
}
-- TAG-UECAPABILITYINFORMATION-STOP
-- ASN1STOP
```

In some embodiments a UE transmits the detailed UE capabilities via UECapabilityInformation message if it is not capable of UE capability ID signaling.

Figure 13:
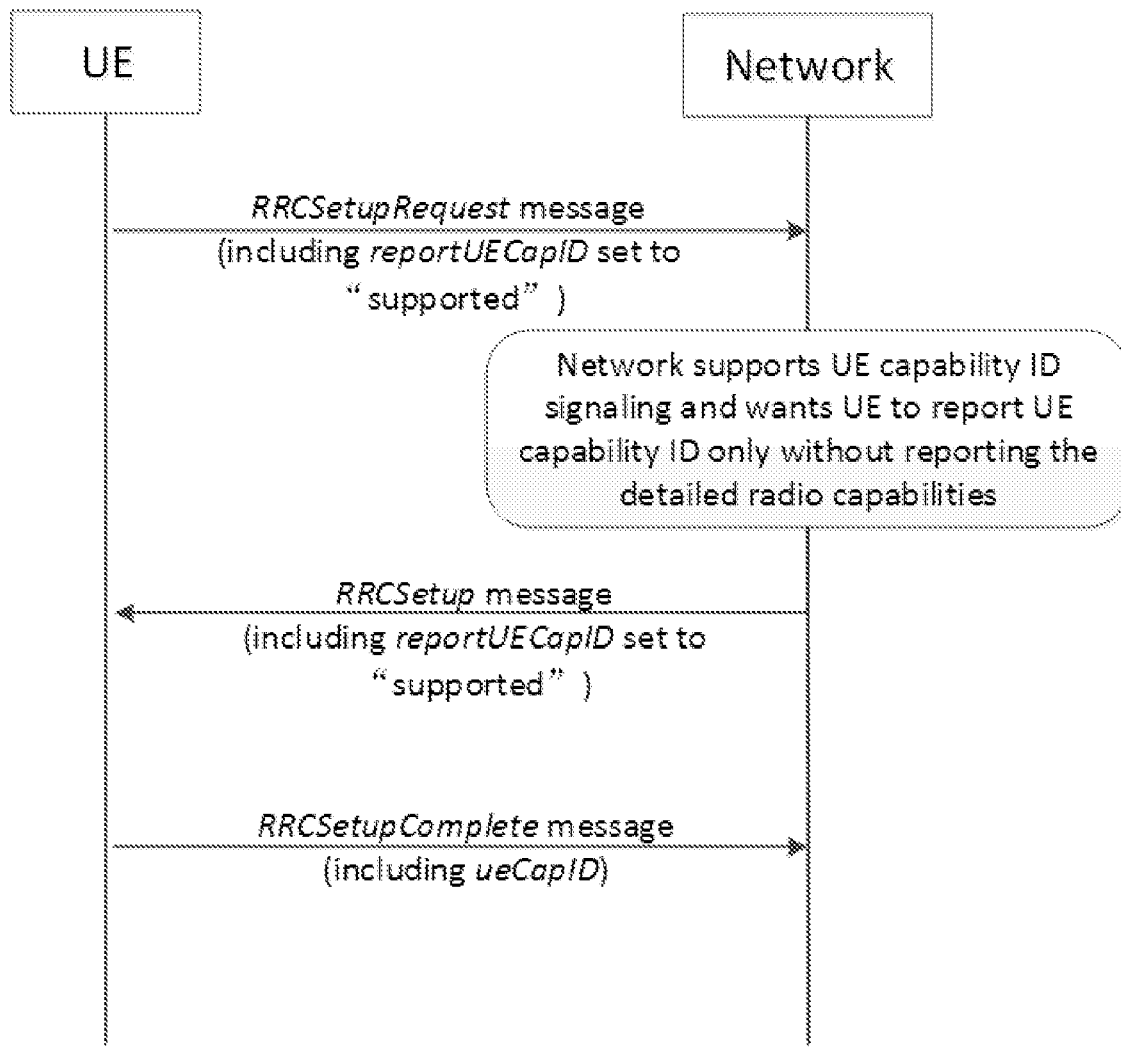
FIG. 13 shows a flowchart for an example method of wireless communication.
Figure 14:
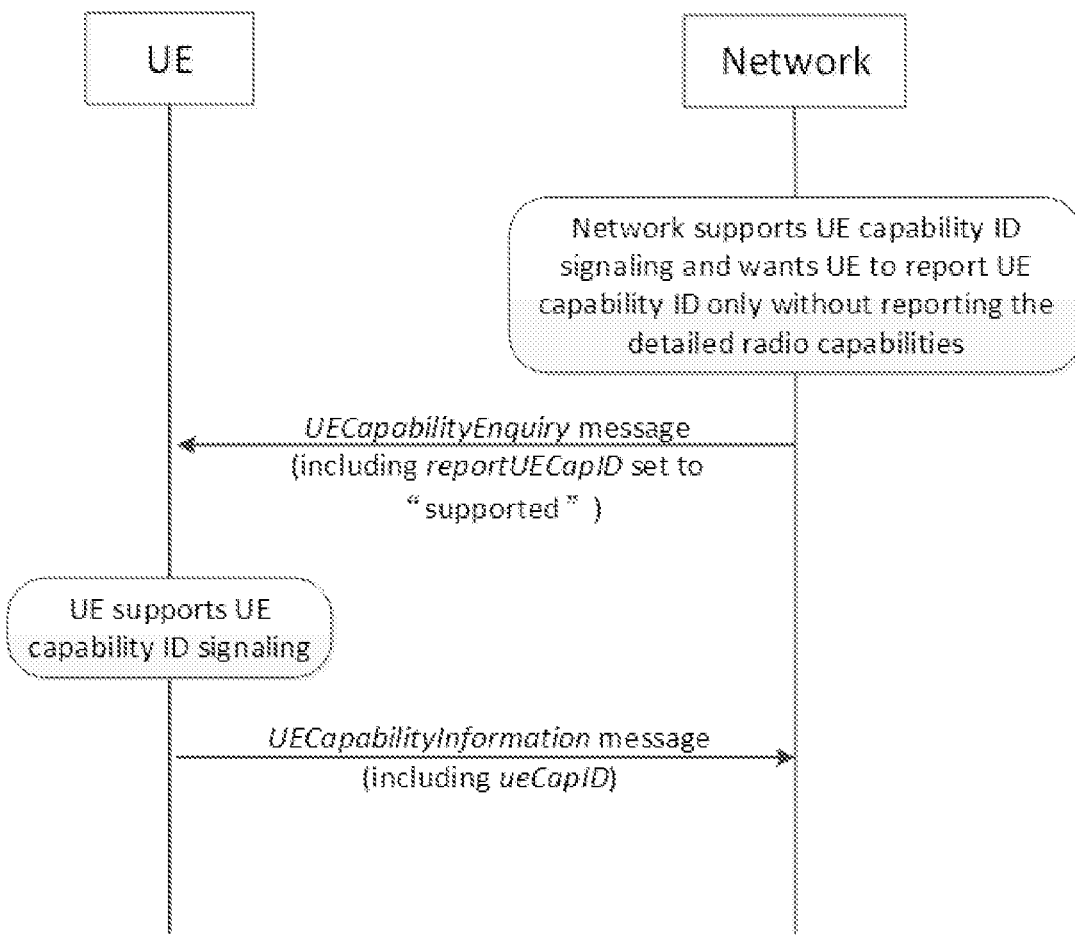
FIG. 14 shows a flowchart for an example method of wireless communication.
Figure 15:
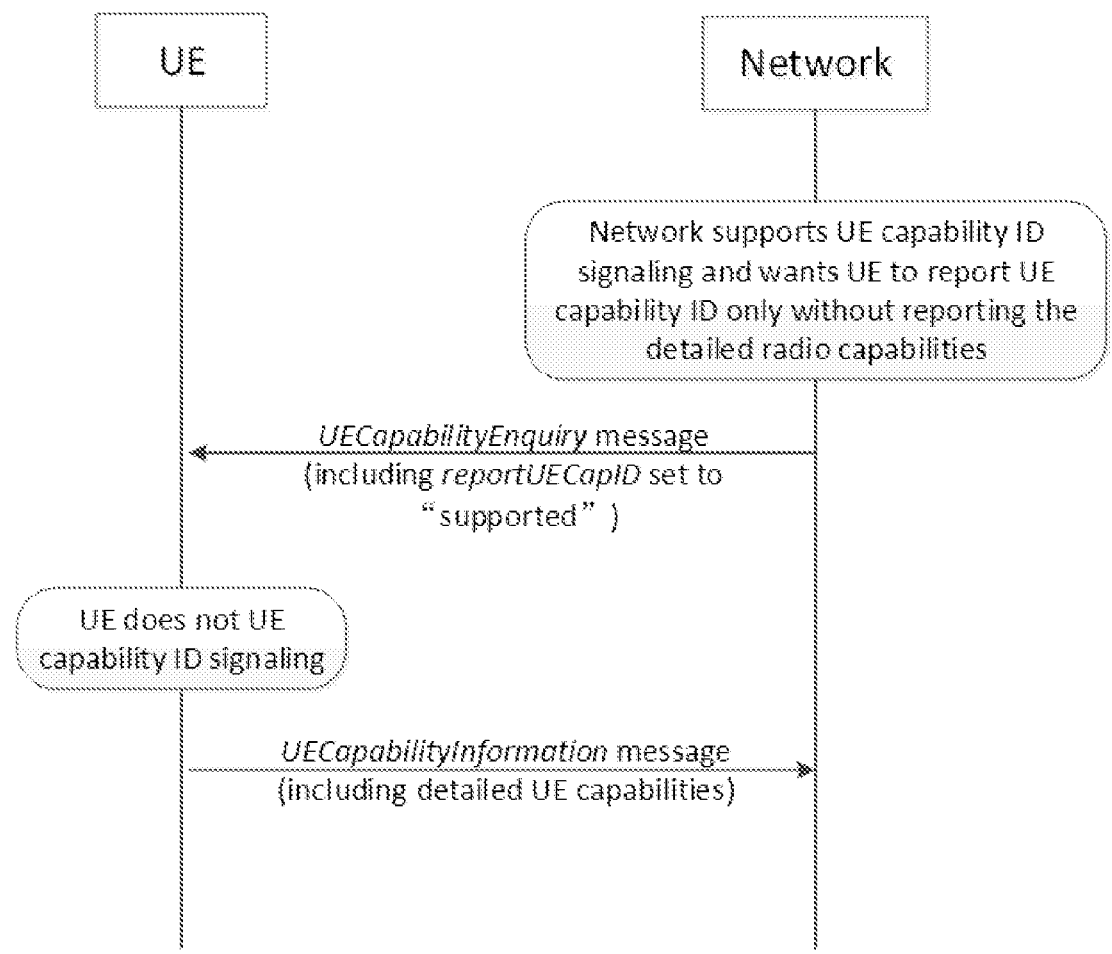
FIG. 15 shows a flowchart for an example method of wireless communication.

With reference to FIGS. 13-15, some examples of processes implemented between a UE and a network device are described.

Example 1

FIG. 13 shows an example 1 of a process implemented between a network device and a wireless device such as user equipment (UE).
  Step 1: UE indicates to network that UE capability ID reporting is supported via RRCSetupRequest message;
  Step 2: Networks supports UE capability ID reporting and wants UE to report UE capability ID only without reporting the detailed radio capabilities;
  Step 3: Network requests UE to report UE capability ID by sending a indication in RRCSetup message;
  Step 4: UE reports the UE capability ID via RRCSetupComplete message according to network's request.

Example 2

FIG. 14 shows an example 2 of a process implemented between a network device and a wireless device such as user equipment.
  Step 1: Networks supports UE capability ID reporting and wants UE to report UE capability ID only without reporting the detailed radio capabilities;
  Step 2: Network requests UE to report UE capability ID by sending a indication in UECapabilityEnquiry message;
  Step 3: UE supports UE capability ID signaling and reports the UE capability ID via UECapabilityInformation message according to network's request.

Example 3

FIG. 15 shows an example of a process implemented between a network device and a wireless device such as user equipment.
  Step 1: Networks supports UE capability ID reporting and wants UE to report UE capability ID only without reporting the detailed radio capabilities;
  Step 2: Network requests UE to report UE capability ID by sending a indication in UECapabilityEnquiry message;
  Step 3: UE does not support UE capability ID signaling and reports the detailed radio capabilities instead.

Figure 16:
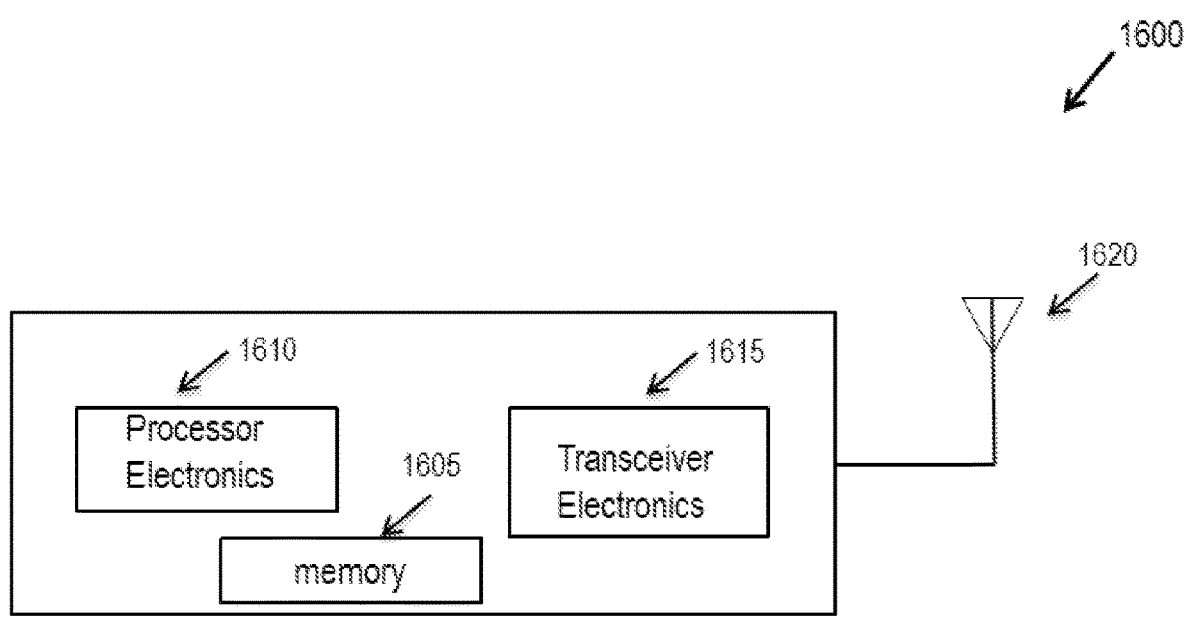
FIG. 16 is a block diagram showing an example embodiment of a wireless communication device.

FIG. 16 is a block diagram of a hardware platform 1605 that may be used for implementing a radio station that may be used to implement a method described in the present document. The hardware platform 1605 may be a part of a network node such as a base station or a wireless device (or UE) can include processor electronics 1610 such as a microprocessor that implements one or more of the wireless techniques presented in this document. The radio station 1605 can include transceiver electronics 1615 to send and/or receive wireless signals over one or more communication interfaces such as antenna 1620. The radio station 1605 can include other communication interfaces for transmitting and receiving data. Radio station 1605 can include one or more memories (not explicitly shown) configured to store information such as data and/or instructions. In some implementations, the processor electronics 1610 can include at least a portion of the transceiver electronics 1615. In some embodiments, at least some of the disclosed techniques, modules or functions are implemented using the radio station 1605.

Figure 17:
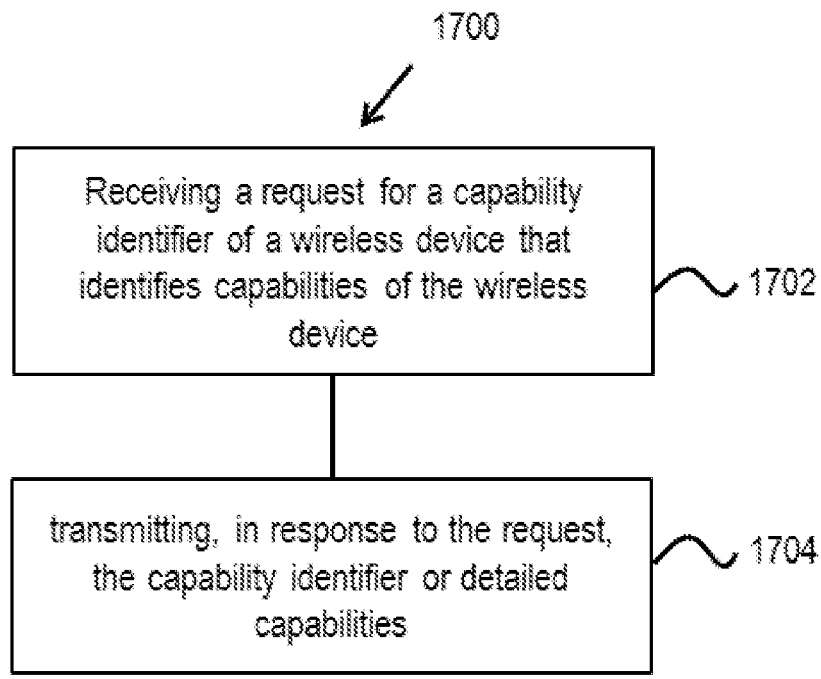
FIG. 17 shows a flowchart for an example method of wireless communication.

FIG. 17 is a flowchart for an example method 1700 of wireless communication. The method 1700 includes receiving (1702), by a wireless device from a network node, a request for a capability identifier of the wireless device that identifies capabilities of the wireless device and transmitting (1704), in response to the request, the capability identifier or detailed capabilities. For example, a legacy UE may send detailed capabilities while a new radio (NR) UE may send the capability identifier, which is a more compact and less-bandwidth-using way of signaling capabilities.

Figure 18:
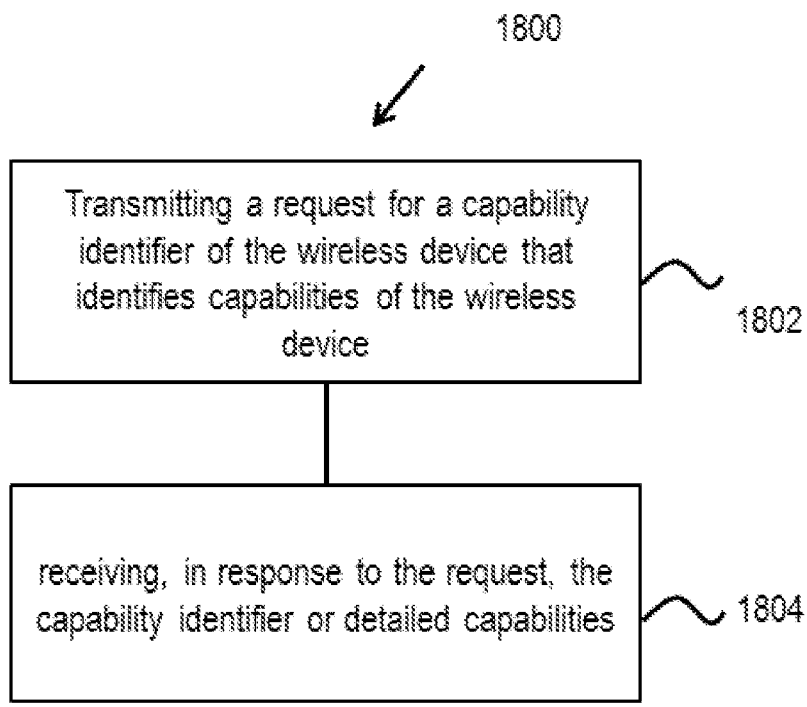
FIG. 18 shows a flowchart for an example method of wireless communication.

FIG. 18 is a flowchart for an example method 1800 of wireless communication. The method 1800 includes transmitting (1802), to a wireless device from a network node, a request for a capability identifier of the wireless device that identifies capabilities of the wireless device, and receiving (1804), in response to the request, the capability identifier or detailed capabilities. For example, detailed capabilities may be received from a legacy UE, while the capability identifier may be received from an NR UE.

Tables 1 to 13 and FIGS. 1 to 15 show specific examples of implementation of the above-described methods in the context of 5G communication, with corresponding examples of messages and information elements used.

In some embodiment, the request may be communicated by a system information message.

In some embodiments, the request is communicated by a dedicated RRC message.

In some embodiments, the dedicated RRC message may be an RRC setup message.

In some embodiments, the dedicated RRC message may be a capability enquiry message. This message may be similar to the various examples of UECapabilityEnquiry message described in the present document.

In some embodiments, the request may be included in an information element in the capability enquiry message.

In some embodiments, the request is included in a separate RAT type in the capability enquiry message.

In some embodiments, the request may be included in an information element in a capability request filter field.

In some embodiments, the request is included in an information element in a capability request filter field of the capability enquiry message.

In some embodiments, the communication of the capability identifier may be performed using the Non-Access-Stratum signaling.

In some embodiments, the capability identifier is included in a dedicated RRC message. For example, the dedicated resource control message may be a radio resource control setup complete message or a capability information message. The ability of the wireless device's capability of transmitting the capability identifier may be signaled in a message which may be an RRC setup request message or an RRC setup complete message. Some examples of the capability information message are described with respect to the UECapabilityInformation information element.

In some embodiments, a wireless device may include a process that controls the execution of the above-described methods and uses transmitter/receiver electronics for performing the transmitting or receiving steps described above.

In some embodiments, the above-described methods may be embodied in form of a computer readable medium that has processor-executable code for implementing one or more of the methods described in the present document.

It will be appreciated that the present document describes techniques that can be used in next generation wireless network to efficiently signal capabilities of a UE in a compact or compressed manner. Furthermore, the disclosed techniques allow for UEs that are capable of using such a compressed signaling, and UEs that are not capable of using the compressed signaling, to coexist and cooperate with the wireless network.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of wireless communication, comprising:
   receiving, by a wireless device from a network node, a request for a capability identifier of the wireless device that identifies capabilities of the wireless device;
   determining, by the wireless device in response to the request for the capability identifier, whether the wireless device is capable of transmitting the capability identifier based on whether the capability identifier is stored in at least the wireless device; and
   transmitting, by the wireless device in response to the determination,
      the capability identifier instead of detailed capabilities of the wireless device, when the wireless device is capable of transmitting the capability identifier, and
      the detailed capabilities of the wireless device, when the wireless device is not capable of transmitting the capability identifier.

2. The method of claim 1, wherein the request is received via a system information message.

3. The method of claim 1, wherein the request is received via a dedicated radio resource control (RRC) message.

4. The method of claim 3, wherein the dedicated RRC message is an RRC setup message.

5. The method of claim 3, wherein the dedicated RRC message is a capability enquiry message.

6. The method of claim 5, wherein the request is included in an information element in the capability enquiry message.

7. The method of claim 5, wherein the request is included in a separate radio access technology type in the capability enquiry message.

8. The method of claim 5, wherein the request is included in an information element in a capability request filter field of the capability enquiry message.

9. The method of claim 1, wherein the transmitting the capability identifier includes transmitting the capability identifier via Non-Access-Stratum signaling.

10. The method of claim 1, wherein the transmitting the capability identifier includes transmitting the capability identifier via a dedicated radio resource control message.

11. The method of claim 10, wherein the dedicated radio resource control message is a radio resource control setup complete message.

12. The method of claim 10, wherein the dedicated radio resource control message is a capability information message.

13. The method of claim 1, further including transmitting an indication that the wireless device is capable of transmitting the capability identifier.

14. A method of wireless communication, comprising:
   transmitting, by a network node to a wireless device, a request for a capability identifier of the wireless device that identifies capabilities of the wireless device, wherein the wireless device determines, in response to the request for the capability identifier, whether the wireless device is capable of transmitting the capability identifier based on whether the capability identifier is stored in at least the wireless device; and
   receiving, by the network node in response to the determination,
      the capability identifier instead of detailed capabilities of the wireless device, when the wireless device is capable of transmitting the capability identifier, and
      the detailed capabilities of the wireless device, when the wireless device is not capable of transmitting the capability identifier.

15. The method of claim 14, wherein the request is transmitted via system information message.

16. The method of claim 14, wherein the request is transmitted via a dedicated radio resource control (RRC) message.

17. The method of claim 16, wherein the dedicated RRC message is an RRC setup message.

18. The method of claim 16, wherein the dedicated RRC message is a capability enquiry message.

19. The method of claim 18, wherein the request is included in an information element in the capability enquiry message.

20. A wireless communication apparatus comprising:
   a processor; and
   a transceiver configured to:
      receive, from a network node, a request for a capability identifier of the wireless communication apparatus that identifies capabilities of the wireless communication apparatus;
      determine, in response to the request for the capability identifier, whether the wireless communication apparatus is capable of transmitting the capability identifier based on whether the capability identifier is stored in at least the wireless communication apparatus; and
      transmit, in response to the determination,
         the capability identifier instead of detailed capabilities of the wireless communication apparatus, when the wireless communication apparatus is capable of transmitting the capability identifier, and
         the detailed capabilities of the wireless communication apparatus, when the wireless communication apparatus is not capable of transmitting the capability identifier.

* * * * *